(12) United States Patent
Joseph

(10) Patent No.: US 6,634,063 B2
(45) Date of Patent: Oct. 21, 2003

(54) CABLE TIE

(76) Inventor: John Michael Joseph, 2827 Echo Way, Sacramento, CA (US) 95821

( * ) Notice: Subject to any disclaimer, the term of this patent is extended or adjusted under 35 U.S.C. 154(b) by 0 days.

(21) Appl. No.: 09/927,257

(22) Filed: Aug. 13, 2001

(65) Prior Publication Data

US 2003/0034171 A1 Feb. 20, 2003

Related U.S. Application Data

(63) Continuation-in-part of application No. 09/620,590, filed on Jul. 20, 2000, now Pat. No. 6,401,305.

(51) Int. Cl.$^7$ ................................................ B65D 63/00
(52) U.S. Cl. ...................... 24/16 R; 24/17 AP; 174/135
(58) Field of Search .............................. 174/72 A, 135; 24/16 PB, 16 R, 17 AP, 30.5 R, 300, 302, 339, 453; 248/59, 60, 71, 68.1, 74.3

(56) References Cited

U.S. PATENT DOCUMENTS

| | | | | |
|---|---|---|---|---|
| 3,233,801 A | * | 2/1966 | Schulenberg | 24/16 PB |
| 3,601,863 A | * | 8/1971 | Dorsey | 24/16 PB |
| 4,342,438 A | * | 8/1982 | Speedie | 24/16 PB |
| 4,470,174 A | * | 9/1984 | Rhea | 24/16 PB |
| 4,991,265 A | * | 2/1991 | Campbell et al. | 24/16 PB |
| 6,073,315 A | * | 6/2000 | Rasmussen | 24/16 PB |
| 6,192,554 B1 | * | 2/2001 | Dumcum | 24/16 PB |
| 6,226,839 B1 | * | 5/2001 | Sayegh | 24/16 PB |
| 6,276,031 B1 | * | 8/2001 | Haiduk | 24/16 PB |

* cited by examiner

*Primary Examiner*—Dean A. Reichard
*Assistant Examiner*—Adolfo Nino
(74) *Attorney, Agent, or Firm*—Alfred F. Hoyte, Jr.

(57) ABSTRACT

An improved cable tie arrangement includes a flexible strap and a locking head. The flexible strap has a series of spaced apertures formed therein. A first group of apertures extending from one end and extending over at least half of the strap, the first group serving to allow for adjustably securing the strap over a cable or other object to be bundled. A second group of apertures extends from an opposing end of said strap, two of the apertures may be used in combination with the locking head to secure a portion of the strap about one loop of a cable to be bundled. The locking head has a central post terminating at opposing ends with radially extending, axially aligned discs sized for locking engagement with the apertures. A third axially aligned disc positioned intermediately along the axis of the post and also radially extending therefrom separates the opposing end discs so that apertures on either end of the strap may be selectively and discretely engaged and disengaged from said discs. The portion of the strap secured to the single loop of the cable may remain attached as the cable is unbundled, thus obviating the need to locate the cable tie when the cable is to be rebundled.

4 Claims, 3 Drawing Sheets

CABLE TIE

CROSS REFERENCE TO RELATED APPLICATIONS

This application is a continuation in part of application Ser. No. 09/620,590, filed Jul. 20, 2000, now U.S. Pat. No. 6,401,305 B1.

BACKGROUND OF THE INVENTION

The present invention relates generally to devices and methods for bundling cables. More particularly, it relates to an improved cable tie arrangement that is inexpensive to manufacture and simple to use.

Statement of the Prior Art

Many types of cable ties are known in the art ranging from the simple wire twist to fairly complicated devices requiring special tools for implementation. The simpler mechanisms suffer from the drawback in that they are not capable of repeated use without failure, or are incapable of retaining heavy or bulky cables effectively. The more complex mechanisms, in addition to often requiring special tools, e.g., for tightening about the cable, are subject to failure. Since non-standard parts are usually used with these ties, replacement of damaged or lost parts is usually not possible.

U.S. Pat. No. 5,367,749 issued to Takeuchi discloses a cable tie having a typical arrangement of lock portion and band portion. The band portion is permanently attached to the lock portion, with the band having a series of regularly spaced sawtooth indentations that cooperate with a sawtooth locking projection formed inside the lock portion. By contrast, the present invention concerns a cable tie arrangement having a separate strap and locking portion.

U.S. Pat. No. 4,993,669 issued to Dyer discloses a cable tie arrangement with a separate tie head and strap. The tie head has a pair of slots for receiving opposing ends of the strap, with a locking means formed within the slots in order to securely retain the strap. The present invention contemplates a cable tie arrangement having a tie head and a separate strap. The tie head retains the strap at three points, thereby allowing the tie head and strap to remain attached to the cable when the cable is unbundled.

U.S. Pat. No. 4,149,298 issued to Forest discloses a tie member for mounting a cable to a chain link fence. The device has means for securely clamping to a single wire of the chain link fence and the cable to be attached to the fence. By contrast, the present invention is a cable tie arrangement having a tie head adapted for retaining a strap securely about a single loop of a bundled cable, while retaining the remaining portion of the strap about the other loops of the cable in order to secure the bundle.

None of the above inventions and patents, taken either singly or in combination, is seen to describe the instant invention as claimed.

SUMMARY OF THE INVENTION

The present invention overcomes the disadvantages of the prior art by providing an improved cable tie arrangement. The arrangement comprises a flexible strap and a locking head. The flexible strap has a series of spaced apertures formed therein. A first group of apertures extending from one end and extending over at least half of the strap, the first group serving to allow for adjustably securing the strap over a cable or other object to be bundled. A second group of apertures extends from an opposing end of said strap, two of the apertures may be used in combination with the locking head to secure a portion of the strap about one loop of a cable to be bundled. The locking head has a central post terminating at opposing ends with radially extending, axially aligned discs sized for locking engagement with the apertures. A third axially aligned disc positioned intermediately along the axis of the post and also radially extending therefrom separates the opposing end discs so that apertures on either end of the strap may be selectively and discretely engaged and disengaged from said discs. The portion of the strap secured to the single loop of the cable may remain attached as the cable is unbundled, thus obviating the need to locate the cable tie when the cable is to be rebundled.

Accordingly, it is a principal object of the invention to provide an improved cable tie arrangement.

It is an object of the invention to provide an improved cable tie arrangement having a separate locking head and strap.

It is another object of the invention to provide an improved cable tie arrangement having a tab at the end to prevent failure of the aperture at the end of the strap.

It is another object of the invention to provide an improved cable tie arrangement made out of a flexible, elastic material.

It is another object of the invention to provide an improved cable tie arrangement having a strap made of EPDM® material.

It is another object of the invention to provide an improved cable tie arrangement having a strap made of TPE® material.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
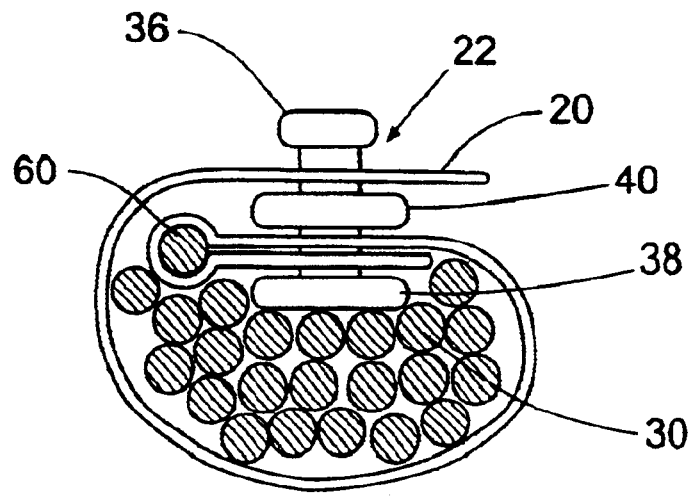
FIG. 1 shows a side view, partly in section, of the cable tie arrangement of the invention shown in use securing a cable.

Referring now to FIGS. 1–5, a cable tie arrangement, made in accordance with the concept of the present invention, and generally indicated by the numeral 10, is shown. The arrangement 10 has two main components, a strap 20 and a tie head 22.

The strap 20 is preferably made of rubber or other elastic material. High strength plastics or other flexible material may also be used. Preferred material for the strap 20 includes EPDM® or TPE® materials. The TPE® material may be used to create straps 20 in many different colors, which may be used for color-coding where, e.g., each size has a distinctive color. Two groups of apertures 24, 26 are formed extending from the opposing ends of the strap 20. A separate aperture 27 serves to capture a single loop of cable 30. The first group of apertures 24 allow for adjustably securing the strap 20 about the cable bundle 30. Tabs (not shown) may be formed at opposing ends of the strap 20, the tabs serving to prevent failure of aperture 27 at one end of the strap, and the aperture 24 closest the opposite end of the strap 20. Preferably, the tabs are formed whenever the TPE® material is used. Apertures 26 in combination with aperture 27 allow for securing the strap 20 about a single loop of the bundled cable 30 as will be explained in more detail later.

The tie head 22 has a central post 34 that connects opposing end discs 36, 38 as well as central disc 40. End disc 38 is larger than end disc 36 and, preferably, has the same diameter as central disc 40. An integral construction may be used to form tie head 22, the tie head 22 preferably being formed of unitary construction, e.g., by molding. Any rigid, durable material may be used to form the tie head 22.

Figure 2A:
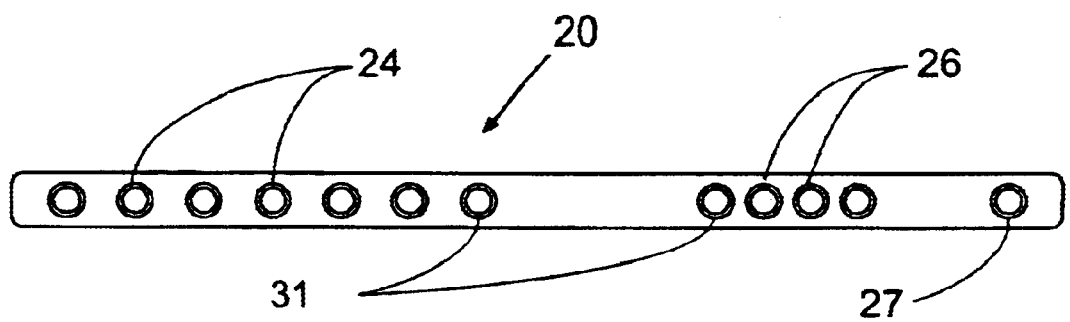
FIG. 2A shows a plan view of the strap of the cable tie arrangement.
Figure 2B:
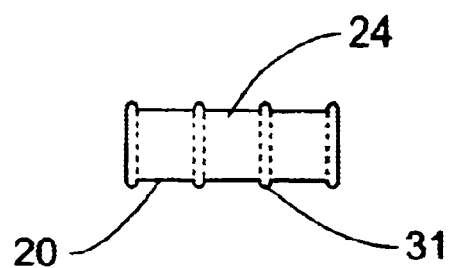
FIG. 2B shows a cross section detailing the reinforcement of holes in the strap of FIG. 2A.

Referring particularly now to FIGS. 2A and 2B it can be seen that both sets of apertures 24, 26, and aperture 27 include a reinforcing bead 30 to reduce the possibility of strap 20 failure due to rupturing of the material proximate the aperture. Apertures 26 and 27 may optionally be formed without beads 30, as the strap 20 portions proximate these apertures are not subject to the same loading and torsional stresses as apertures 24. To ensure that the strap 20 remains securely attached to tie head 22 under high stress conditions, the apertures 24, 26 are substantially smaller than end discs 36, 38. As has been previously mentioned, in the preferred embodiment, apertures 24 allow for securing the strap 20 about the cable bundle 30, while apertures 26 allow for securing the strap 20 about a single loop of the cable bundle 30.

The smaller diameter of end disc 36 facilitates engagement and disengagement of disc 36 from the strap 20 by allowing apertures 24 to easily be stretched over and removed therefrom. Conversely, the larger diameter of end disc 38 serves to prevent unintended disengagement with the selected aperture 26 and/or aperture 27, which would result in the cable becoming unbundled. It can be readily appreciated that ease of disengagement of end disc 36 is desirable to allow for ease of adjusting the tension with which cable bundle 30 is secured, as well as facilitate intentional unbundling of the cable. The relatively large diameter of discs 38 and 40 combine to ensure the strap 20 and tie head 22 remain secured about cable bundle 30.

Figure 3:
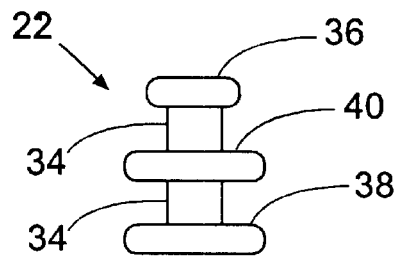
FIG. 3 shows a side view of the tie head of the cable tie arrangement.
Figure 4:
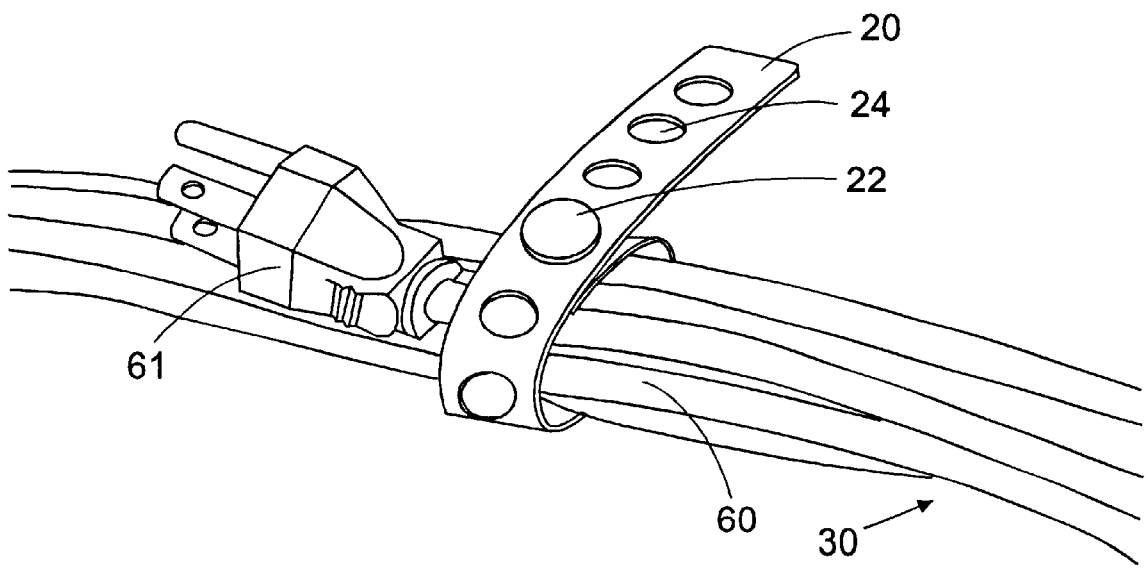
FIG. 4 shows a perspective view of the cable tie arrangement of the invention securing a cable.
Figure 5:
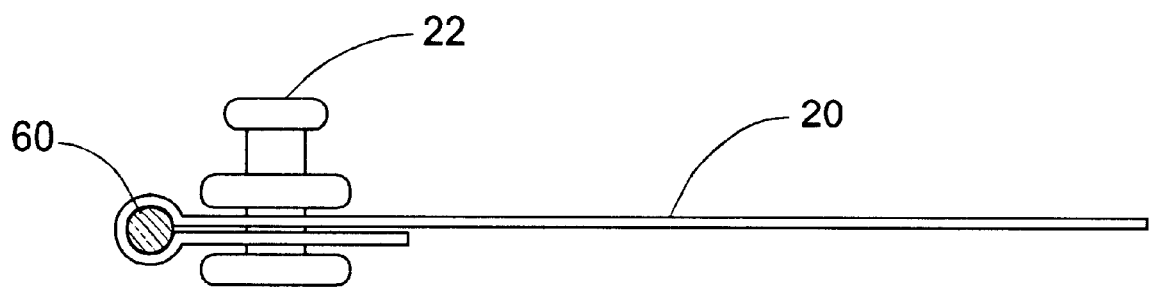
FIG. 5 shows a cross sectional view detailing the first step in securing the cable tie arrangement of the invention to a cable bundle.

In operation, once the cable is bundled, as can be seen most clearly in FIGS. 1 and 5, a single loop 60 of the cable bundle 30 is selected. In order to prevent dangling of the plug 61 the loop selected should include the plug 61. One of apertures 26 of strap 20 is then selected for placement over disc 38 immediately adjacent the portion of the loop 60 nearest the plug 61 to allow for later binding of the plug 61 against the cable bundle 30 as shown in FIG. 4. The aperture 26 closest to aperture 27 secures the smallest gauge cable, while the aperture 26 closest to apertures 24 secures the largest gauge cable the strap is capable of securing. Of course, varying the spacing and number of apertures 26, in combination with the spacing of aperture 27 from the group of apertures 26, varies the range of wire gauges that can be accommodated by a given strap 20. Once the selected aperture 26 has been placed over disc 38, the strap 20 is wrapped around loop 60 and placed over disc 38 to capture the loop as shown in FIG. 3. The tie head 22 and strap 20 may remain secured in this position whether the cable is bundled or unbundled, thus obviating the need to locate the cable tie 10 whenever the cable is to be bundled. The strap 20 may then be wrapped about the cable bundle 30 as shown in FIG. 1, with the appropriate aperture 24 placed over disc 36 when the strap 20 is sufficiently tense to secure the bundle 30.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A cable tie arrangement for securing a cable bundle comprising:

a strap, said strap having first and second series of spaced apertures formed therein, said first and second series of apertures extending from opposing ends of said strap;

a tie head, said tie head including a pair of mutually opposed first and second locking discs, said first locking disc for securing a selected one of said first series of apertures to secure said strap about said cable bundle, said second locking disc for securing a selected pair of said second series of apertures to secure a selected length of said strap about said single loop of said cable bundle, said tie head also including a third disc disposed centrally of said first and second locking discs;

wherein said third disc and one of said first and second locking discs have the same diameter, the other of said locking discs having a relatively smaller diameter.

2. The cable tie arrangement of claim 1 wherein said first, second, and third discs are connected by a single axially centered post.

3. The cable tie arrangement of claim 1 wherein said strap is made from a flexible material.

4. The cable tie arrangement of claim 1 wherein said strap includes reinforcing means formed about both said first and second series of apertures.

* * * * *